United States Patent [19]

Zuckerman

[11] 4,390,147

[45] Jun. 28, 1983

[54] THREE SPEED DRIVE MECHANSIM FOR FISHING REEL

[76] Inventor: Stephen D. Zuckerman, 2444 Wilshire Blvd., #510, Santa Monica, Calif. 90403

[21] Appl. No.: 295,769

[22] Filed: Aug. 24, 1981

[51] Int. Cl.³ ............................................ A01K 89/00
[52] U.S. Cl. ...................................... 242/215; 74/670; 254/342
[58] Field of Search .................. 242/214, 215; 74/670; 254/342

[56] References Cited

U.S. PATENT DOCUMENTS

| | | | |
|---|---|---|---|
| 1,895,304 | 1/1933 | Ancona | 242/215 |
| 2,220,519 | 11/1940 | Grieten | 242/214 |
| 2,282,995 | 5/1942 | Dumond | 242/214 |
| 2,321,820 | 6/1943 | Kachel | 242/215 |

FOREIGN PATENT DOCUMENTS 1115185 12/1955 France ................. 242/215

Primary Examiner—Billy S. Taylor
Attorney, Agent, or Firm—Roger A. Marrs

[57] ABSTRACT

A fishing reel is disclosed herein having a frame or cage rotatably supporting a spool for fishing line storage via a turning shaft provided with a driven spool gear. The frame further supports a gear housing having at least three drive gears of varying diameters in mesh with the spool gear and a rotatable crank plate carrying a crank handle which is selectively engageable with a desired one of said drive gears depending upon the speed of spool rotation desired. Limit stops are provided for limiting the extent of crank plate rotation so as to align the crank handle with a desired drive gear and a detent mechanism operates with the crank plate to indicate location of the crank handle with respect to a drive gear having a one-to-one drive ratio with respect to the spool gear.

8 Claims, 6 Drawing Figures

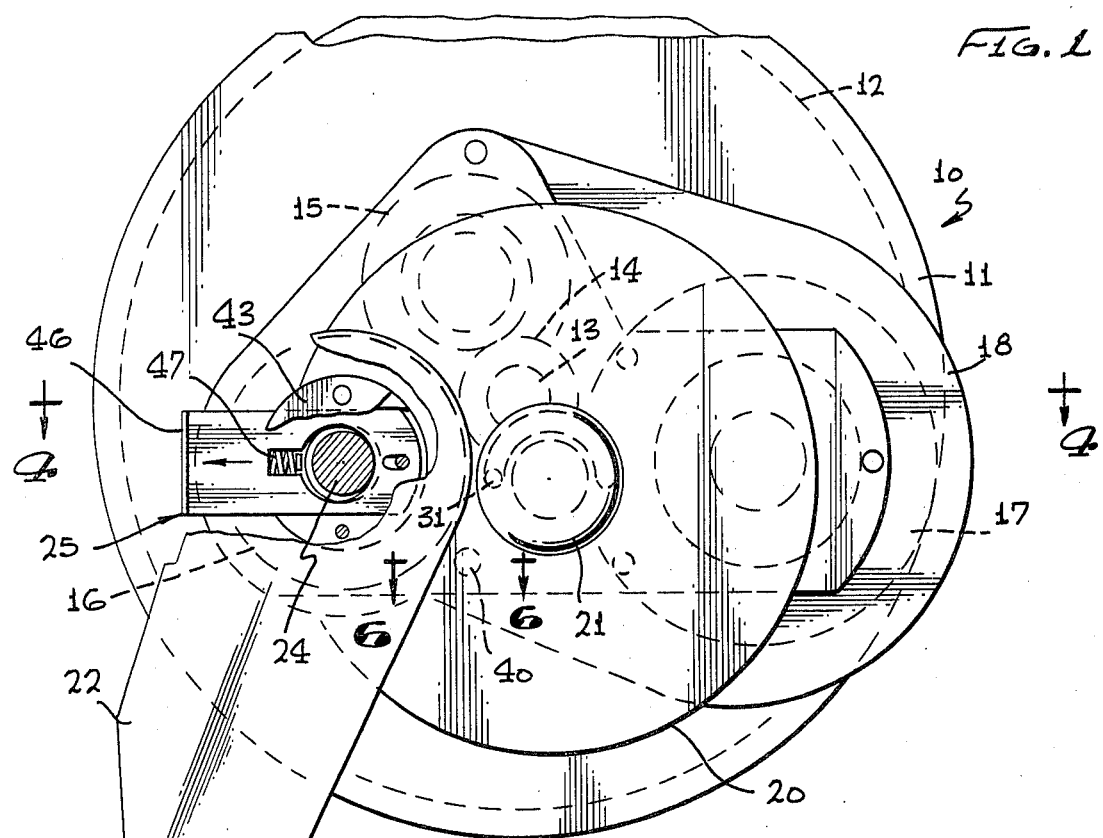
FIG. 1
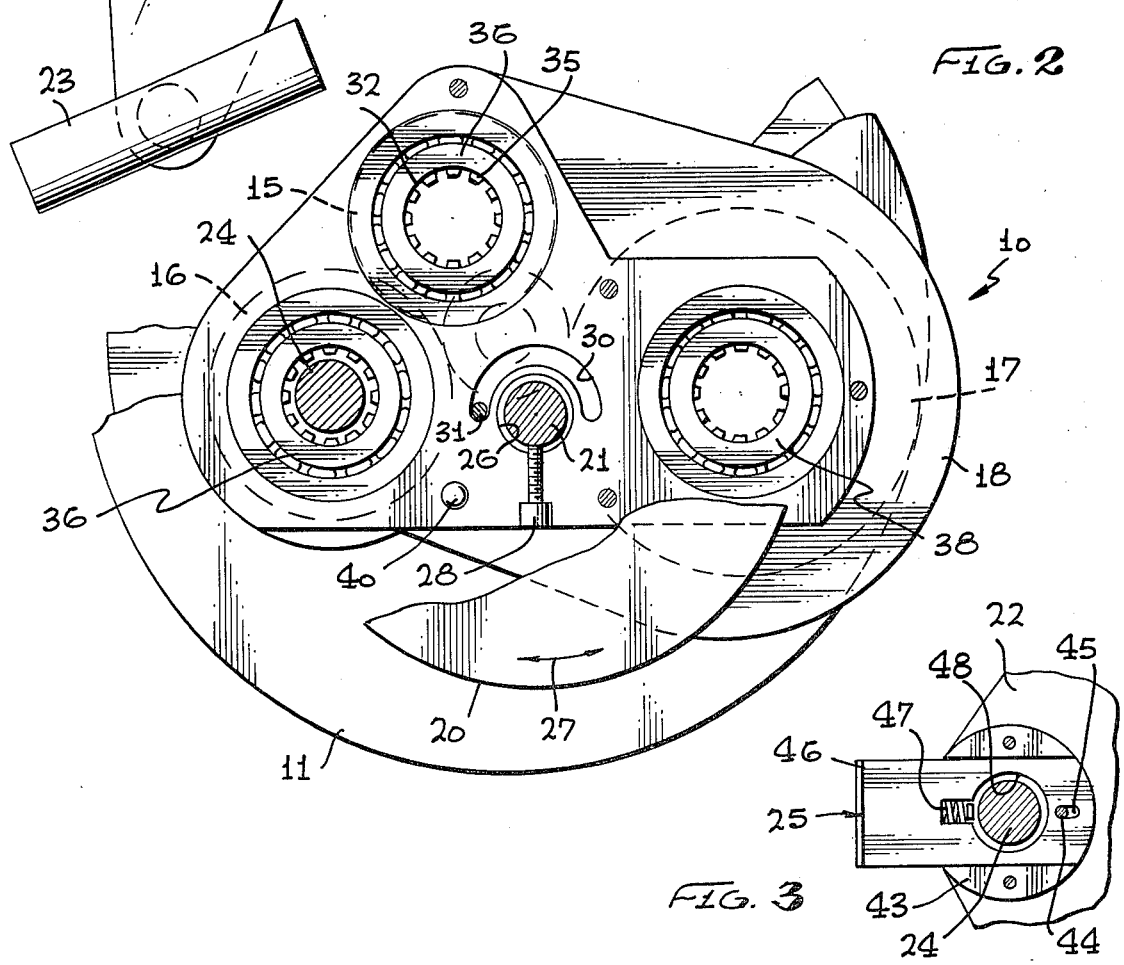
FIG. 2
FIG. 3

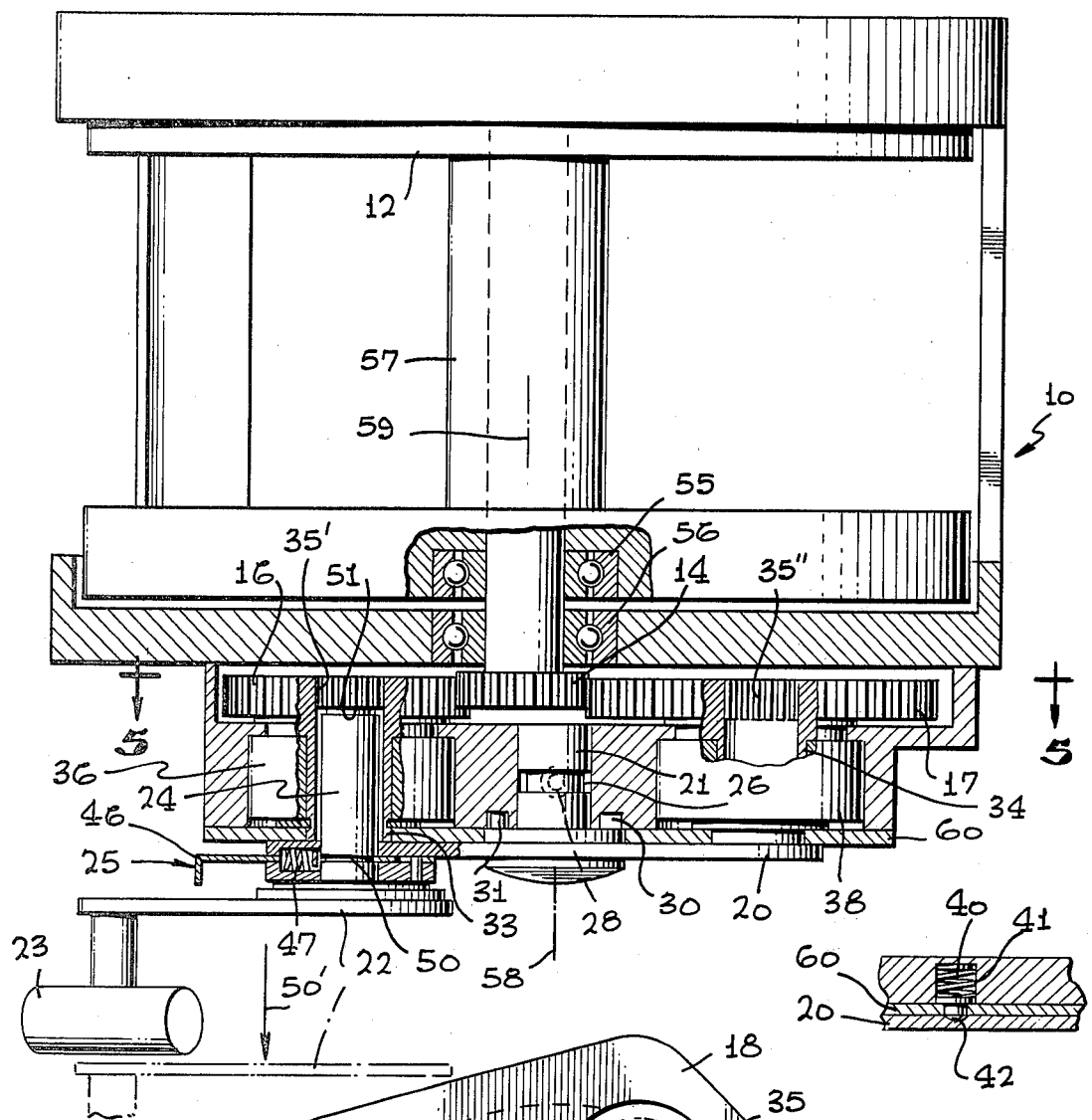
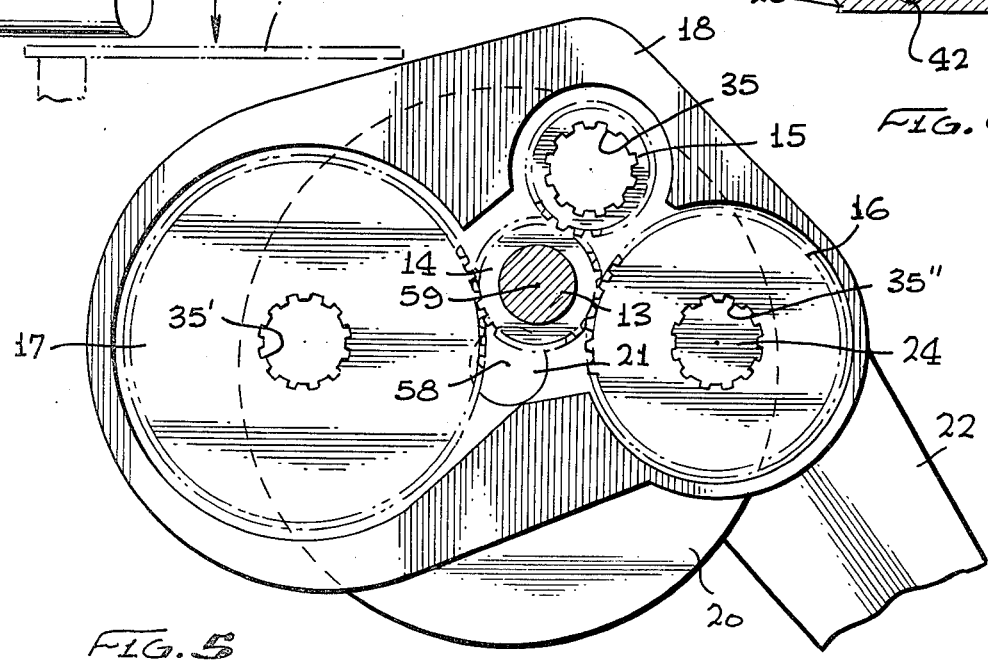

THREE SPEED DRIVE MECHANSIM FOR FISHING REEL

BACKGROUND OF THE INVENTION

1. Field of the Invention

The present invention relates to fishing reels in general and more particularly, to a novel fishing reel having means by which the rate of rotation of the spool may be varied by readily adjustable gear mechanism.

2. Brief Description of the Prior Art

It has been the conventional practice to construct fishing reels with either a non-variable speed drive between the crank handle and the fishing line storage spool or with a set of alternate drive gears of different diameters so that either one or the other drive gear is engagable for speed control. Usually, when a pair of drive gears are incorporated into the mechanism, the ratios are either three to one or two to one in common with a one to one gear ratio. However, not all three gear ratios are available in a single construction. This limitation is largely due to the fact that space is restricted and it is extremely difficult to provide a selection mechanism for registering or aligning the crank handle with a selected drive gear which is speedy in adjustment and convenient to the user.

It must be borne in mind that a fisherman uses only one hand for turning the crank handle while his other hand is employed for supporting the fishing rod. Therefore, selection mechanism for aligning or registering the crank handle with the proper drive gear should be achieved by the user's hand turning the crank handle. Also, it is noted that prior selection or adjustment systems generally require removal of the hand from the crank handle so that various levers may be depressed or a variety of screws or latches may be turned. In other prior art systems, the user must at least manipulate certain fingers on the hand employed for turning the crank handle so that gear selection may be achieved. All of these procedures are awkward, cumbersome and detract from the fisherman's concentration on the fishing procedure. Also, the choice of gear ratios is extremely limited so that the fisherman must pre-select which reel to use depending upon his anticipated employment of gear ratio ranges. For example, in one instance the fisherman may choose a reel having a one to one ratio drive gear and a three to one drive gear while in another instance, he may choose a reel having a one to one ratio drive gear and a two to one ratio drive gear.

Therefore, it can be seen that a long standing need has existed to provide a novel speed control and mechanism for fishing reels which will offer the user at least three speeds of operation and which will provide a selection mechanism that is readily convenient to the fisherman and which may be operated with speed and without loss of concentration on the fishing procedure.

SUMMARY OF THE INVENTION

Accordingly, the above problems and difficulties are obviated by the present invention which provides a novel fishing reel having an adjustable feed control by which the rate of rotation of the spool may be varied through selective registration of the crank handle with a desired one of a plurality of drive gears of different ratio. The fishing reel is adapted to be secured to a support and includes a frame or cage for rotatably mounting a fishing line storage spool which is rotated by means of a turning shaft provided with a driven spool gear. A gear housing is mounted on the frame having at least three drive gears of varying diameters rotatably carried thereon by suitable bearing means and which are in mesh with the spool gear wherein one of the drive gears is driven while the other two are in idle. A rotatable crank plate carrying a crank handle is operably mounted on the housing wherein the crank handle is selectively setable or engagable with a desired one of the drive gears depending upon the speed of spool rotation desired. Stop means are provided for limiting the extent of crank plate rotation so as to register or align the crank handle with a desired drive gear while a detent mechanism operates with the crank plate to indicate location of the crank handle with respect to a selected one of the drive gears such as the drive gear having one to one drive ratio.

A feature of the invention resides in the fact that the pivot or axis of rotation for the crank plate is the center location of a circle or arc upon which the center of rotation of all the drive gears lies.

It is another feature or object of the present invention to provide a novel speed control means for a fishing reel by which the rate of rotation of the fishing line storage spool may be varied by readily adjustable means.

Another object of the present invention is to provide a novel speed control for a fishing reel which permits the location and selection of at least three different gear ratios so that the user may readily select any one of a variety of speeds.

Still another object of the present invention is to provide a novel speed control for a fishing reel wherein at least three gears of different ratios may be physically located in a convenient manner so as to permit a crank handle to be selectively registered with a particular drive gear of the plurality so as to select a particular speed.

A further object of the present invention is to provide a novel speed control for the spool of a fishing reel which may be readily operated by the hand of the user.

A further object of the present invention is to provide a novel speed control for the spool of a fishing reel which may be readily operated by the hand of the user while turning the crank handle so that gear change may be readily achieved in a convenient and rapid manner.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a side elevational view of the novel fishing reel incorporating the speed control and mechanism of the present invention;

FIG. 2 is a view similar to the view shown in FIG. 1 having the crank handle removed so as to expose the underlying arrangement of drive gears;

FIG. 3 is a fragmentary view of a releasable lock mechanism employed in holding the crank handle in a desired location;

FIG. 4 is a transverse cross sectional view of the fishing reel shown in FIG. 1 as taken in the direction of arrows 4—4 thereof;

FIG. 5 is a cross sectional view of the fishing reel exposing the drive gears thereof as taken in the direction of arrows 5—5 of FIG. 4; and FIG. 6 is an enlarged view of a spring loaded detent mechanism employed in registering the crank plate with a selected one of the drive gears as taken along lines 6—6 of FIG. 1.

DESCRIPTION OF PREFERRED EMBODIMENT

Referring to FIG. 1, the novel fishing reel of the present invention incorporating the three speed gear box is indicated in the general direction of arrow 10 which includes a frame 11 for rotatably supporting a fishing line storage spool 12 which is fixed to a turning shaft 13 having a driven pinion or spool gear 14. The turning shaft 13 and spool gear 14 are in mesh with and are driven by a selected one of a plurality of drive gears such as indicated by numerals 15, 16 and 17 respectively. The driven spool gear 14 and the drive gears 15-17 inclusive are enclosed by a housing 18 which is secured to the face of the frame 11.

Rotatably carried on the housing 18, there is also provided a crank plate 20 which is retained thereon by means of a flat head pin 21. A crank handle 22 having a turning element 23 on its free end is carried adjacent the peripheral edge of the crank plate 20 by means of an elongated shank or shaft 24 which projects through the housing into contact with a selected one of the drive gears 15, 16 or 17. For purposes of illustration, the crank handle 22 via its shank 24 is in engagement with drive gear 16. The shank of the crank handle 22 is coupled to the plate 20 by means of a spring loaded latch mechanism identified by numeral 25 which will be described later.

Referring now in detail to FIG. 2, it can be seen that the pin 21 is rotatably carried within a bore 26 in housing 18 so that the plate 20 may be rotated in either direction as indicated by the arrow 27. The pin 21 and hence, the plate 20, is retained by means of a set screw 28 having its terminating end protruding into a groove formed in the shank of the pin. Immediately adjacent to the bore 26 and the housing 18, there is provided a semi-circular groove identified by numeral 30 into which a pin 31 travels between the opposite ends of the groove. This construction forms a limit means since the pin 31 downwardly extends from the underside of plate 20 so that the rotation of plate 20 terminates upon engagement of the pin 31 with either end of the groove 30.

It can also be seen in FIG. 2 that each of the respective drive gears 15, 16 and 17 include cylindrical shanks or sleeves 32, 33 and 34 respectively. The lower end of the bore forming the shank is provided with a plurality of splines such as splines 35 associated with shank 32 and drive gear 15. As will be seen more clearly later, the terminating end of the shaft or shank 24 attached to the handle 22 includes a plurality of splines which will engage and mate with the splines 35 carried on each of the respective drive gears when that particular drive gear has been selected for receiving the imparting driving motion from the crank handle. The respective drive gears and their shanks are carried in respective recesses and cutouts in the body of housing 18 and the shanks of the respective drive shafts are incorporated through bores in the inner race of bearings such as indicated by numerals 36, 37 and 38 respectively.

It is also to be noted that the plate 20 rotates about a central axis of the pin 21 which is substantially offset from the central axis of rotation for the turning shaft 13 and its attendant spool gear 14. However, the central rotating axis for the respective gears 15, 16 and 17 all lie on an arc or circle having the central axis of the plate and pin 21 as its center while all of the drive gears are meshed with the pinion or spool gear 14. Therefore, when one of the drive gears is being driven by the crank handle 22, the other two drive gears are merrily idling.

In order to index or register the crank handle 22 and its shaft 24 with the middle gear 15, the housing 18 is provided with a hole which is occupied by a detent 40 and a spring 41 which is shown more clearly in FIG. 6. The detent 40 is adapted to bear against the underside of the plate 20 so as to be depressed into an opening or depression 42 provided in the undersurface of plate 20. When alignment occurs between the detent and the depression, the user knows that the shaft 24 is in proper position to be engaged with the splines 35 of the midgear 15.

Referring now to FIG. 3 in detail, the latch mechanism 25 for retaining the crank handle shaft 24 in either a plate 22 rotation position or in a drive gear rotation position is illustrated. The latch mechanism is attached to the plate 20 by means of a mounting plate 43 which includes an opening for receiving the shaft or shank 24. The mounting plate also includes a pin 44 which slides in a slot 45 provided in a sliding latch 46. The latch is normally biased outwardly by means of an expansion spring 47 which normally and yieldably maintains an edge of the hole identified by the numeral 48 in contact with either one of two grooves provided in the shaft or shank 24. For example, when the crank handle 22 is in the position shown in FIG. 1 so that it is intended to drive gear 16, the latch 46 will be in an upper slot identified by numeral 50 in FIG. 4. When it is desired to rotate plate 20 so as to position the shaft or shank 24 to rotate another drive gear, the shank or shaft is raised along with the handle 22 so that the splines on the end of the shaft disengage with drive gear 16 and the latch 26 engages with the lower groove 51. The latch 46 is yieldable to the upward pressure of the shaft 24 so as to snap in and out of the respective groove upon manual positioning of the shaft via handle 22.

Referring now in detail to FIG. 4, the positioning of the shaft 24 as previously described with reference to FIG. 3, is again illustrated wherein the latch 46 is yieldably and releasably in contact with groove 50 while the handle 22 is in the gear rotating position for drive gear 16. It can be seen that the shaft 24 is substantially occupied throughout the length of the gear shaft 33 so that the splines at the extreme end thereof and identified by numeral 35' are engaged with the gears of drive gear 16. In this instance, the latch 46 is only in yieldable contact with groove 50 or groove 51 adjacent the splines.

When the handle 22 is moved to the position shown in broken lines in the drection of arrow 50', the latch 46 is yieldably snapped out of groove 50 and will snap into groove 51 when the shank or shaft 24 is raised to the point where groove 51 is indexed or registered with the latch 46. The action of spring 47 effects the movement of the latch in and out of the respective grooves.

FIG. 4 also illustrates the disposition of pin 31 into groove 30 which acts as a stop means to prevent the rotation of crank plate 20 beyond the limits of the groove. Also, it can be seen that the splines identified by numeral 35" are carried within the bore of the shaft 34 associated with gear 17 so that when it is desired to employ this drive gear, the splines carried on the end of shaft 24 are engaged therewith.

FIG. 4 also illustrates that the frame of cage 11 rotatably mounts the spool 12 by means of bearings 55 and 56 and that the spool includes a central hub 57 on which fishing line may be wound for storage. The hub 57 is attached to the shaft 13 so that it will rotate when the spool gear 14 is moved by the selected driving gear taken from one of the three drive gears 15, 16 or 17. Also, it can be seen that the plate 20 will rotate on its pin 21 which lies on a central longitudinal axis indicated by numeral 58 which is offset from the central longitudinal axis of the spool gear and shaft which is indicated by numeral 59. This relationship is shown more clearly in FIG. 5.

Referring now in detail to FIG. 5, it can be seen that the splines 35, 35' and 35" are carried on the drive gears 15 through 17 inclusive. The spool gear 14 is shown in mesh with all of the drive gears; however, only drive 16 will move the spool gear since the crank handle shaft 24 is inserted into and engaging with the splines associated with this gear. The center rotating axis is identified by numeral 58 for the crank plate 20 while the numeral 59 indicates the central turning axis for the spool shaft 57 and its attendant spool gear 14. It can be seen that these axes are offset from one another and that the central turning axis for each of the respective drive gears lies on an arc or circle having the axis 58 as its center. In one example, gear 15 represents a one to one ratio while gear 16 represents a two to one ratio and gear 17 provides a three to one ratio wherein all gears are in mesh with the spool gear. Two of the drive gears will idle while the third gear is being employed in the winding process of using the reel.

Referring now in detail to FIG. 6, it can be seen that the detent mechanism is employed for indicating when the crank plate 20 is in the proper rotational position in order to align the shaft 24 with the bore and splines 25 of the drive gear 15. Alignment of the crank plate and shaft 24 with the other apertures and splines associated with gears 16 and 17 are indicated when the pin 31 engages with the opposite ends of the track or groove 30. Therefore, an index location is available for proper registration of the shaft 24 with each of the respective splines associated with drive gears. Crank plate 20 is illustrated in FIG. 6 as being rotatably disposed with respect to a cover 60 which is screwed to the top of the housing 18. Proper holes and apertures are provided in the cover to permit the detent 40 to engage with the depression 42 on the underside of the crank plate 20. Also, holes or apertures are available for insertion of the shaft 24 of the crank mechanism respectively.

In view of the foregoing, it can be seen that the gear box of the present invention provides a novel means for adjusting the rate of rotation of the spool by means of insertably disposing the crank shaft 24 into a respective driving relationship with a selected one of the drive gears via the engagement of splines. The crank shaft 24 is readily locatable to one of three positions by means of rotation of crank plate 20. The shaft 24 is readily raised or lowered with respect to the housing 18 by means of the latch mechanism 25 whereby the shaft removes its attendant splines from engagement with a selected drive gear while the plate 20 is being rotated to a new location. The new location is sensed by either the detent 40 being engaged with its depression 42 to indicate alignment of the shaft 24 with the splines on the gear 15 or with either of the other splines of gears 16 and 17 when the pin 31 engages with opposite ends of the groove 30. In this movement or rotation, the user's hand need not be removed from the crank handle 23 so that the user's concentration is not disrupted.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A fishing reel adapted to be secured to a support comprising:
   a frame including housing plates spaced apart substantially parallel to each other;
   a spool shaft rotatably carried on said housing plates;
   a gear housing mounted on one of said housing plates having a gear chamber provided therein adjacent to and closed by said one of said housing plates;
   a pinion gear carried on said spool shaft within said gear chamber;
   drive gears of different diameters rotatably mounted on said housing within said gear chamber and in constant mesh with said pinion gear;
   crank handle means rotatably carried on said gear housing adapted to be alternatively and detachably coupled with a selected one of said drive gears to vary the speed of rotation of said shaft;
   indexing means operably connected between said crank handle means and said housing for registering said crank handle means with said selected one of said drive gears; and
   limiting means operably connected between said crank handle means and said housing for restricting the extent of crank handle means rotation with respect to said housing so as to align said crank handle means with said selected one of said drive gears.

2. The invention as defined in claim 1 including:
   a detent mechanism operable between said crank handle means and said housing for yieldably indicating alignment of said crank handle means with a predetermined one of said drive gears.

3. The invention as defined in claim 2 wherein:
   said handle means includes a central axis offset from a central axis of said spool shaft.

4. The invention as defined in claim 3 wherein:
   said handle means includes a crank handle and a plate;
   said plate being rotatable on said gear housing and said crank handle being shiftably carried on said plate.

5. The invention as defined in claim 4 including:
   resilient means yieldably coupling said handle and said plate to said gear housing so that said crank handle is in engagement with a selected one of said drive gears.

6. The invention as defined in claim 5 wherein:
   each of said drive gears includes an elongated sleeve projecting through said gear housing for terminating immediately adjacent said crank handle means plate;
   said sleeve of each of said drive gears having an open-ended bore for insertably receiving a crank shaft carried on said handle; and
   said plate having an opening for passing said crank shaft when registered with a selected one of said drive gear sleeve bores.

7. The invention as defined in claim 4 wherein:

each of said drive gears includes a turning axis and said central axis of said handle means is a turning axis;

said drive gear turning axes being arranged equidistant from said handle means turning axis so that said drive gear turning axes are offset from one another lying in an arc or circle having said handle means turning axis as its center.

8. The invention as defined in claim 7 wherein:

said handle means includes a splined shaft and said drive gears include splined bores for insertably receiving said splined shaft.

* * * * *